July 1, 1969      E. BERMAN      3,453,639
ELECTRON BEAM RECORDING ON A PHOTOCONDUCTIVE RECORD MEDIUM
Filed April 15, 1964
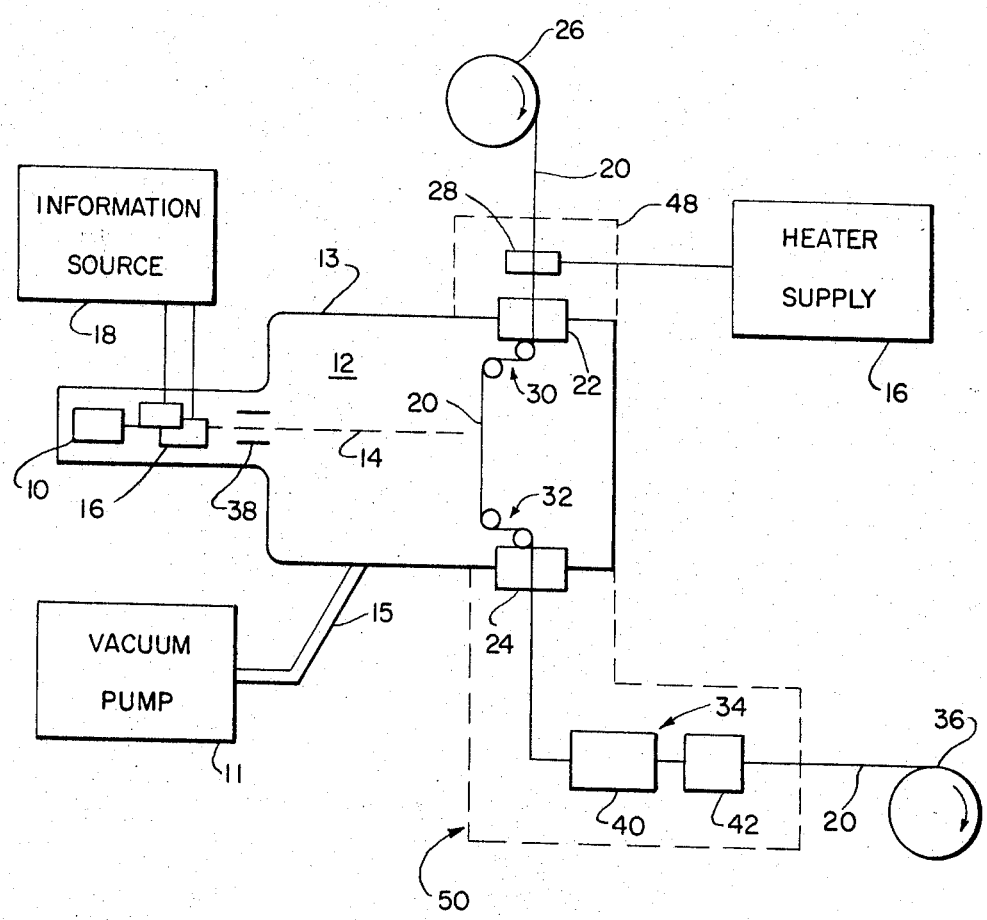
INVENTOR
ELLIOT BERMAN
BY Stanley Belek
ATTORNEY United States Patent Office 3,453,639
Patented July 1, 1969

3,453,639
ELECTRON BEAM RECORDING ON A PHOTO-CONDUCTIVE RECORD MEDIUM
Elliot Berman, Braintree, Mass., assignor to Itek Corporation, Lexington, Mass., a corporation of Delaware
Filed Apr. 15, 1964, Ser. No. 360,008
Int. Cl. G01d 9/00, 15/06, 15/08
U.S. Cl. 346—1
13 Claims

ABSTRACT OF THE DISCLOSURE

An electron beam recording process comprises exposing to an image pattern of electrons a photoconductive image-forming recording medium which is activated and rendered chemically reactive in exposed portions to form a latent image of the image pattern of electrons. This latent image can be stored for later development or can be developed by contacting with suitable image-forming materials to produce a permanent irreversible image. In a preferred process an electron beam image pattern is projected on a photoconductive image-forming recording medium comprising titanium dioxide to form a latent image in the recording medium, and then subsequently the recording medium is contacted with a chemical redox system to form a visible image corresponding to the image pattern of projected electrons.

---

This invention relates to recording an electron beam trace. More particularly, it relates to a method and apparatus for recording an electron beam trace without the use of an intermediate fluorescent screen. In brief, the invention provides an electron beam information readout device in which the electron beam impinges directly on a recording medium disposed inside the vacuum chamber of the device. Following exposure to the beam, the recording medium is developed to produce a permanent positive image. The resolution of the image is superior to that obtained with conventional photographic techniques. Moreover, the electron beam-producing apparatus, and the vacuum in which it operates, are substantially unaffected by the presence of the recording medium.

Electron beam traces are conventionally recorded by sweeping the beam of a cathode ray tube over a fluorescent screen and photographing the resultant visual image. This is relatively inefficient, because substantial energy is lost in producing the visual image on the fluorescent screen and, further, in the optical system between the screen and the photosensitive medium. A further disadvantage of photographically recording an electron beam trace is that the resolution of the final recorded trace is substantially below that of the electron beam.

To overcome these problems, sensitive materials have been fed through the tube for direct exposure to the electron beam. One such prior technique for recording an electron beam trace is disclosed in U.S. Patents Nos. 2,616,961 and 2,630,484 issued to J. Groak. According to these disclosures, the electron beam is made to impinge on a heat sensitive recording medium. The recorded image results secondarily from the heat energy produced when the electrons in the beam strike the recording medium.

These prior recording materials for direct exposure to the electron beam evolve gases detrimental to the operation of the electron beam-producing apparatus, commonly referred to as an electron gun. More specifically, the gases reduce the electron emission from the cathode of the electron gun. Emission from many sensitive materials also destroys the vacuum in the electron beam chamber, resulting in undesirable scattering of the beam.

Accordingly, it is an object of the present invention to provide an improved method and apparatus for recording an electron beam trace.

Another object of the invention is to provide an electron beam recording method and apparatus characterized by high efficiency. A further object of the invention is to provide an electron beam recording method and apparatus characterized by high resolution.

It is also an object of the invention to provide apparatus of the above character which is not detrimental to the electron gun producing the trace being recorded, or to the vacuum in which the electron gun is operating.

A further object of the invention is to provide electron beam recording apparatus that produces a permanent image on which further information can be recorded.

Another object of the invention is to provide an electron-beam type information recording device capable of high linearity.

A further object of the invention is to provide recording apparatus of the above character capable of recording rapid deflections of an electron beam.

Other objects of the invention will in part be obvious and will in part appear hereinafter.

The invention accordingly comprises the several steps and the relation of one or more of such steps with respect to each of the others, and the apparatus embodying the features of construction, combination of elements and arrangement of parts adapted to effect such steps, all as exemplified in the following detailed disclosure, and the scope of the invention is indicated in the claims.

For a fuller understanding of the nature and objects of the invention, reference should be had to the following detailed description taken in connection with the accompanying drawing, which is a diagrammatic representation of electron beam information readout apparatus embodying the invention.

The invention makes use of the photoconductive properties of certain materials sensitive to radiation. It has now been found that an electron beam incident on such materials produces a latent image corresponding to the trace of the electron beam. The latent image is readily made permanent and visible by subjecting it to a developer that reacts with the irradiated material to plate out on the recording medium a visible reproduction of the latent image.

The high resolution provided by the recording technique also enables it to record rapid deflections of an electron beam on a recording strip passed through the cathode ray tube.

Moreover, the recording medium does not emit undesirable gases in the vacuum of the electron beam device and hence does not detract from the vacuum or from the operation of the electron gun.

More particularly, the now abandoned co-pending Berman et al. application, Ser. No. 199,211, filed May 14, 1962 and assigned to the assignee hereof, discloses a recording medium comprising photoconductive materials adaptable for use in the electron beams recording apparatus and method of the present invention. Exposure of the medium to activating radiation renders it chemically reactive. The exposed recording medium is then contacted with a developer system that effects a chemical redox reaction with the activated, chemically reactive, portions of the exposed medium. Thus, as disclosed in detail in the Berman et al. application, a substrate coated with a photoconductor such as titanium dioxide can be exposed and developed in this manner.

For example, the exposed recording medium may be contacted with a solution containing ions of a metal such as copper, silver, mercury or gold. The ions are chemically reduced to free metal at the activated chemically reactive portions of the recording medium. Although the recording medium can be exposed to the radiation so as to reduce thereon sufficient free metal to form a visible image during the initial development, less intense and shorter exposure times can also be used. These latter exposures result in the deposition of amounts of free metal insufficient to form readily visible images. Such "latent developed images" can be amplified by contact with developer systems of a type known in the silver halide photographic art, such as those comprising silver ion in admixture with a reagent forming a redox system such as hydroquinone. Developer systems of this type deposit further free metal on a surface where free metal is already present. Alternatively, they can be used alone in a single developing step to form a visible image directly.

Turning to the electron beam recording apparatus shown in the drawing, it comprises a conventional electron gun 10 supported within and at one end of a vacuum chamber 12 enclosed by an envelope 13 suitably of glass. The gun 10 projects a beam 14 of electrons past deflection electrodes 16. The electrodes are connected with an information source 18 and deflect the beam 14 according to the signal they receive from the information source.

The chamber 12 is at a reduced pressure, as is conventional for electron beam devices and, where desired, is continually maintained at the reduced pressure by a vacuum pump 11 communicating with the chamber via an exhaust tube 15.

At the other end of the envelope 13 the electron beam 14 impinges on a recording medium in the form of a tape or strip 20 passing through the chamber 12 without undue pressure leakage by means of vacuum seals indicated at 22 and 24. These seals can be constructed as shown in the above-mentioned Groak patents.

The recording medium comprise a photoconductive material of the type described in the above-mentioned co-pending Berman et al. application, Ser. No. 199,211, including, for example, Ge, BN, $TiO_2$, ZnO, $ZrO_2$, $GeO_2$, $In_2O_3$, $K_2Al_6Si_6O_{22}2H_2O$, $2H_2O$, $SnO_2$, $Bi_2O_3$, PbO, BeO, $Sb_2O_5$, $SiO_2$, $BaTiO_3$, $Ta_2O_5$, $TeO_2$, $B_2O_3$, ZnS, and $SnS_2$. Many of these are photoconductive compounds of metals with non-metals of Group VI–A of the Periodic Table. For example, the compounds include metallic oxides and metallic sulfides.

The illustrated recorder has a preferred recording medium of titanium dioxide ($TiO_2$) as described in the commonly owned co-pending application of Ekman et al., Ser. No. 360,113 filed Apr. 15, 1964 and now U.S. 3,409,429. The $TiO_2$ recording medium is on a substrate, for example of titanium.

The strip 20 exits from the envelope 13 via the seal 24 and passes through developing apparatus indicated generally at 34 to a take-up reel 36.

When the feed and take-up reels 26 and 36 pass the strip 20 through the chamber 12 at a continuous rate, the deflection electrodes 16 deflect the beam transverse to the direction of motion of the strip to form a conventional strip chart recording. The recording medium can, alternatively, be intermittently advanced through the chamber 12 on a frame-by-frame basis. For this operation, a further set of time-base deflecting electrodes 38 are provided along the beam 14 adjacent the electron gun 10. The operation of the gun 10 and deflecting electrodes 16 and 38 is well-known to those skilled in the art, as is the voltage generating and controlling apparatus (not shown) that operates them.

With this arrangement, upon striking the recording medium electrons from the beam 14 cause the titanium diode to become chemically reactive. Thus the energy in the beam 14 directly forms a latent image on the surface of the strip 20, which latent image corresponds precisely with the movement of the electron beam across the strip. This latent image persists while the recording strip 20 emerges from the vacuum chamber 12 and enters the developing apparatus 34.

In a first developing stage 40, the exposed strip 20 is contacted with a solution containing metallic ions; silver nitrate is suitable. The chemically reactive portions on the recording medium chemically reduce the silver ions to free silver molecules that plate out on the recording strip. As a result, the strip 20 emerges from the first developing stage 40 with a pattern of metallic silver that corresponds precisely with the electron beams trace it was exposed to.

The recording medium can be exposed for a sufficient time, and to an electron beam having sufficient energy, to plate out in the first developing stage 40 sufficient silver to produce a readily visible positive image. However, it is generally preferable to expose the recording medium for a brief interval and to an electron beam of substantially less energy. In such cases, the silver image formed in the first developing stage 40 is intensified by passing the strip 20 through a second developing stage 42. This developing stage preferably employs a conventional photographic silver halide developer which deposits further free metal on the strip only where the silver was deposited in the first developing stage 40.

It will thus be seen that the energy in the electron beam 14 is directly converted to a chemically reactive latent image on the recording medium. There are no intermediate energy conversion steps as found with prior art techniques. The resultant permanent image has high resolution. As will now be described, this resolution enables the present recorder to have high linearity as compared to prior electron beam recorders.

It is well-known that the linearity with which the deflecting field produced at the electrodes 16 deflects the electron beam 14 decreases as the deflection is increased. In addition, the deflection defocusing of an electron beam increases with the amount of beam deflection.

However, because of the limited resolutions of prior electron beam recording devices, particularly those in which the beam impinges on a fluorescent screen, relatively large beam deflections have heretofore been needed in order to distinguish more fully the fluctuations of the beam trace.

As noted above, the present recorder, on the other hand, produces an image having high resolution. Accordingly, the beam being recorded may have only a small deflection, thereby preserving its linearity and focus, and still producing a recorded image having high detail.

A further advantage of the recorder is that it can record exceedingly rapid deflections of the beam 14 and hence read out information at a rapid rate. By analogy to other strip chart recording techniques, successive deflections of an electron beam along one axis may be spaced apart by continually advancing the recording strip transversely to that axis.

To separate successive deflections, the rate of advance must increase with the rate at which the electron beam is deflected. However, when the recorded image has low resolution, a still higher rate of advance is needed in order to distinguish the individual deflections of the recorded trace.

Thus, since the present recorder records an image with high resolution, i.e. formed of thin and sharply defined lines, the successive deflections of a rapidly varying beam are recorded distinctly from each other with a relatively low rate of advance of the recording strip.

Referring again to the drawing, the heater 28 adjacent the vacuum seal 22 in effect erases chemically reactive patterns that may be on the recording medium prior to its exposure to the electron beam 14. Such patterns may result from accidental exposure to activating radiation, for example, from sun light or fluorescent lights. The heater 28 thus deactivates the medium.

For this purpose, the heater 28 is constructed with an electric heating element, powered by a supply 46 to radiate infrared energy toward the strip 20 and momentarily elevate its temperature sufficiently to provide deactivation.

The strip should be returned to room temperature before exposure to the electron beam 14.

Where the recorder is exposed to external activating radiation, a radiation seal 48, indicated with dashed lines, is provided adjacent the envelope 13 enclosing the recording strip 20 as it passes between the heater 28 and the seal 22. Similarly, a radiation shield 50 encloses the exposed strip 20 as it passes out of the chamber 12 at the vacuum seal 24 and moves to the developing apparatus 34.

In the event that a permanent recording is not required of an electron beam trace to which the recording medium has already been exposed, the latent image can readily be erased, as by heating the exposed recording medium in the same manner as it is heated with the heater 28. The recording medium is unaffected by an exposure that has been erased and hence can be reused.

Development of an image does not affect the sensitivity of the semiconductor recording media used with the present invention. Accordingly, after an image has been developed, the recording medium can again be exposed to electromagnetic radiation to record further information or indicia in addition to the already recorded electron beam trace.

The recorder has numerous uses. However, its high linearity and high speed capability render it particularly suitable for registering the output from data processing apparatus. In this application, the recorder can read out information that is in digital form as well as information in analog form.

In summary, the novel electron beam recording equipment and method utilizes a photoconductive recording medium to directly record the energy of an electron beam. The image recorded from the beam is not visible but has substantial life and is readily processed to form a permanent visible image. The latent image maintains its high resolution throughout the developing process. The high resolution of the resultant recording enables the recorder to record rapidly fluctuating information without having to advance the recording medium at an excessive rate.

By achieving electron beam recording with a direct energy conversion, the recording apparatus and method are highly efficient, and are capable of recording relatively low energy electron beam traces.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawing shall be interpreted as illustrative and not in a limiting sense.

Having described the invention, what is claimed as new and secured by Letter Patent is:

1. An electron beam recording process for producing a visible image of an electron beam pattern, said process comprising the steps of:
   (A) exposing to an image pattern of electrons a photoconductive image-forming recording medium, said recording medium being reversibly activated and rendered chemically reactive by such exposure in exposed portions of said medium to form a latent image of said image pattern of electrons, and
   (B) rendering said latent image permanent by contacting said medium with image-forming materials which react chemically in exposed portions of said medium, said process being carried out in the absence of any externally-applied electric charge other than that associated with the image pattern of electrons.

2. The process defined in claim 1 in which said latent ically activated portions with a liquid redox system chemically reacting on such contact with said chemically reactive portions of said medium to form a visible image corresponding to said image pattern of electrons.

3. The process defined in claim 1 wherein said recording medium consists essentially of a photoconductor.

4. The process defined in claim 1 wherein said photoconductive image-forming recording medium comprises titanium dioxide in a suitable binder.

5. The process defined in claim 1 further comprising the step of deflecting said image pattern of electrons.

6. The process defined in claim 1 further comprising the steps of:
   (A) deflecting said image pattern of electrons along a first axis, and
   (B) advancing said recording medium in a direction transverse to said first axis and substantially perpendicular to said image pattern of electrons.

7. The process defined in claim 1 comprising the further step of deflecting said beam along a first axis and along a second axis transverse to said first axis.

8. An electron beam recording process comprising the steps of:
   (A) deflecting an electron beam along a first axis in accordance with a signal,
   (B) exposing said electron beam to a photoconductive image-forming recording medium, said recording medium being reversibly activated and rendered chemically reactive by such exposure in exposed portions of said medium to form a latent image corresponding to the deflection of said electron beam.
   (C) providing a relative advancing movement between said recording medium and said electron beam and transverse to said first axis, and
   (D) Rendering said latent image permanent by contacting said medium with chemically reactive image-forming materials, said process being carried out in the absence of any externally-applied electric charge other than that associated with said electron beam.

9. The process defined in claim 8 comprising the further step of deactivating said recording medium prior to exposing it to said deflected electron beam.

10. A process for recording an electron beam trace comprising the successive steps of:
    (A) passing into the vacuum chamber of an elecron beam device a photoconductive recording medium of the type that is reversibly activated and rendered chemically reactive upon exposure to incident radiation in the exposed portions thereof,
    (B) exposing said recording medium in said chamber to an electron beam deflected along a first axis in accordance with an information signal that is to be recorded, thereby to form on said medium a latent image of said beam deflection pattern, and
    (C) contacting at least said chemically reactive portions of said recording medium with a liquid redox system chemically reacting on such contact with said chemically reactive portions of said medium to form a permanent, irreversible image corresponding to said beam deflection pattern.

11. The process defined in claim 10 comprising the further steps of:
    (A) continuously feeding said recording medium into said vacuum chamber and into exposure relation with said electron beam in a direction transverse to said first axis, and
    (B) heating said recording medium before passing it into said chamber to deactivate irradiated portions thereof.

12. An electron beam recording process for recording an image pattern of electrons, said process comprising the successive steps of:
    (A) exposing to an image pattern of electrons a photoconductive image-forming recording medium comprising at least one photosensitive compound of a metal with a nonmetal of Group VI–A of the Periodic Table, said recording medium being rendered chemically reactive in exposed portions to form a latent image of said image pattern of electrons, and (B) rendering said latent image permanent by contacting said medium with image-forming materials which react chemically in exposed portions of said medium, said process being carried out in the absence of any externally-applied electric charge other than that associated with the image pattern of electrons.

13. The process defined in claim 4 wherein said latent image is rendered visible by contacting with a chemical redox system comprising silver ion.

References Cited

UNITED STATES PATENTS

| | | | |
|---|---|---|---|
| 3,152,903 | 10/1964 | Shepard et al. | 96—64 |
| 3,245,785 | 4/1966 | Miller. | |
| 3,281,858 | 10/1966 | Schwertz. | |
| 3,199,086 | 8/1965 | Kallmann | 346—74 |

BERNARD KONICK, *Primary Examiner.*

U.S. Cl. X.R.

250—65; 346—74, 110